United States Patent
Beck et al.

(10) Patent No.: US 6,665,304 B2
(45) Date of Patent: Dec. 16, 2003

(54) METHOD AND APPARATUS FOR PROVIDING AN INTEGRATED CLUSTER ALIAS ADDRESS

(75) Inventors: Paul R. Beck, Carlisle, MA (US); Larry Cohen, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/224,372

(22) Filed: Dec. 31, 1998

(65) Prior Publication Data

US 2001/0014097 A1 Aug. 16, 2001

(51) Int. Cl.⁷ ............................................. H04L 12/56
(52) U.S. Cl. ................................... 370/401; 709/203
(58) Field of Search ............................. 370/216, 217, 370/218, 219, 220, 221, 351, 352, 353, 354, 355, 356, 357, 462, 395.1, 392, 389, 401, 395.52; 709/223, 224, 227, 229, 203, 217

(56) References Cited

U.S. PATENT DOCUMENTS

| | | | |
|---|---|---|---|
| 4,799,215 A | 1/1989 | Suzuki | 370/60 |
| 4,815,071 A | 3/1989 | Shimizu | 370/60 |
| 4,884,263 A | 11/1989 | Suzuki | 370/16 |
| 5,371,852 A * | 12/1994 | Attanasio et al. | 709/245 |
| 5,790,546 A | 8/1998 | Dobbins et al. | 370/400 |
| 5,828,318 A | 10/1998 | Cesar | 340/825.69 |
| 5,862,348 A * | 1/1999 | Pedersen | 709/229 |
| 5,918,017 A * | 6/1999 | Attanasio et al. | 709/224 |
| 5,930,259 A | 7/1999 | Katsube et al. | 370/409 |
| 5,996,089 A * | 11/1999 | Mann et al. | 714/6 |
| 6,006,259 A * | 12/1999 | Adelman et al. | 709/223 |
| 6,016,319 A | 1/2000 | Kshirsagar et al. | 370/410 |
| 6,044,402 A | 3/2000 | Jacobson et al. | 709/225 |
| 6,061,349 A | 5/2000 | Coile et al. | 370/389 |
| 6,078,957 A * | 6/2000 | Adelman et al. | 709/224 |
| 6,108,708 A | 8/2000 | Iwata | 709/238 |
| 6,182,224 B1 | 1/2001 | Phillips et al. | 713/201 |
| 6,192,411 B1 | 2/2001 | Chan et al. | 709/232 |
| 6,195,680 B1 | 2/2001 | Goldszmidt et al. | 709/203 |
| 6,253,230 B1 | 6/2001 | Couland et al. | 709/203 |
| 6,266,335 B1 * | 7/2001 | Bhaskaran | 370/389 |
| 6,317,775 B1 | 11/2001 | Coile et al. | 709/201 |
| 6,324,177 B1 | 11/2001 | Howes et al. | 370/389 |
| 6,327,622 B1 * | 12/2001 | Jindal et al. | 709/228 |
| 6,330,605 B1 | 12/2001 | Christensen et al. | 709/226 |
| 6,335,919 B1 | 1/2002 | Maegawa | 370/254 |
| 6,370,584 B1 * | 4/2002 | Bestavros et al. | 709/201 |
| 6,470,389 B1 * | 10/2002 | Chung et al. | 709/227 |
| 6,549,538 B1 * | 4/2003 | Beck et al. | 370/395.52 |

* cited by examiner

Primary Examiner—Douglas Olms
Assistant Examiner—Brian Nguyen

(57) ABSTRACT

In accordance with the present invention, a method is disclosed for making a cluster of processor nodes appear as a single processor node to client applications that operate in conjunction with that cluster. More particularly, the cluster is provided with a skinny stack application for selecting a processor node, to which a connection will be established, after consideration has been given to the TCP port numbers that the processor node is listening for. Further, the cluster is provided with a method for tunneling data packets between processor nodes of the cluster such that the data packets do not have to be re-transmitted across a network. Further still, the cluster is provided with a virtual subnet to which the cluster alias address is associated. The route to that subnet is advertised to the network routers by the processor nodes that are associated with the virtual subnet. Lastly, the cluster is provided with a method for substituting a processor node of the cluster in place of a processor node that has failed, for the duration of the routing failover delay. Using such a method, data packets directed to the failed processor node are prevented from being dropped during that routing failover delay.

16 Claims, 10 Drawing Sheets

METHOD AND APPARATUS FOR PROVIDING AN INTEGRATED CLUSTER ALIAS ADDRESS

BACKGROUND OF THE INVENTION

Generally speaking, computer systems typically include one or more central processor nodes, referred to simply as "processor nodes" or "nodes". Each of those processor nodes includes one or more network interface modules, connected to a computer network, for communicating with other processor nodes. Each network interface module has an associated network layer address or IP address to which packets of information are directed. The network layer address allows processor nodes to communicate with one another by sending those packets of information across the computer network. Each packet includes a header that contains the network layer addresses of the originating, or source, processor node and of the destination processor node.

Groups of processor nodes can be connected in an arrangement referred to as a "cluster". Generally, processor nodes within a cluster are more tightly coupled than in a general network environment and act in concert with one another. For example, all of the processor nodes within a cluster can share a common file system such that they are able to access the same files. Also, each of the processor nodes within the cluster can use the same security domain files such that common user names and passwords may be utilized to log on to any of the processor nodes.

A cluster should appear as a single processor node to clients accessing that cluster. In other words, a cluster should present a common set of software services that can be executed by any of the associated processor nodes. Therefore, regardless of which processor node is accessed by a client, the same services will be provided. In such a manner, processor nodes can be seamlessly added to the cluster to increase the capacity of those services without the cluster looking any different to the client.

To make a cluster appear to be a single processor node, it should have a single network layer address. Such a network layer address is referred to as a "cluster alias address". That cluster alias address should not be tied to one specific node within the cluster but rather should be collectively associated with all the processor nodes. To that end, the cluster's network layer address must be accessible regardless of what the current membership of the cluster is. The current membership of a cluster is defined by the nodes that are "up" and capable of running the software services required by any client accessing the cluster. Accordingly, a client accessing the cluster over a network does not need to know which nodes within the cluster are currently up and running in order to access the software services that the cluster provides.

While each of the nodes in a cluster having a cluster alias address typically provide the same services, some of those nodes may provide those services in a more efficient manner. For example, a node may include a hardware circuit for accelerating a particular operation which the other cluster nodes perform in software, or vice versa. Because prior art clusters simply distribute new connections amongst existing nodes, a client that gains access to the cluster in order to perform the above mentioned operation will be assigned a connection regardless of the capabilities of that chosen node. The operation will be performed, but the client will incur additional overhead if it is connected to one of the nodes that does not have the more efficient capabilities. Therefore, each processor node is associated with specific port numbers. The client application that issued the data packet is also associated up, or binds to, a "port number".

A port number is essentially a queue into which data packets, that are sent to a processor node, are stored for servicing. Software programs, referred to as receiver applications or datalink applications, execute on the processor nodes of a cluster and monitor specific port numbers for data packets sent from clients via established connections.

Each processor node within the cluster has the ability to distribute received data packets to an appropriate processor node for servicing. The processor node receiving the data packet from the network will hereinafter be referred to as the "receiving processor node" for that transaction. When a data packet arrives at the cluster, the receiving processor node first determines the type of the data packet. For example, most data packets correspond to the TCP/IP or UDP network protocols. The receiving processor node further determines whether the data packet is associated with an existing connection to an application running on one of the processor nodes within the cluster or whether a new connection should be established.

When a receiving processor node receives a new data packet that is addressed to the cluster alias address, and which requests establishment of a new connection, the receiving processor node executes an application to select an available processor node in the cluster. That selection is typically performed without regard to the associated port number. If the receiver application for that processor node is not monitoring the associated port number, a connection cannot be established. In that situation, the connection attempt will timeout and the client will have to re-transmit another connection request. Such an occurrence increases the overhead of the connection operation by increasing the amount of time needed to establish a connection. Further, requiring the client to subsequently re-try a connection attempt destroys the image of the cluster as a single node because the re-transmission of the connection request is an attempt to connect to another processor node in the same cluster.

Further still, when the receiving processor node determines a processor node of the cluster to which a new connection should be established, it retransmits the data packet to the selected processor node over the network. In other words, the data packet's header is modified to reflect the network layer address of the selected destination processor node, and the data packet is re-broadcast on the network for delivery to that processor node. Such an operation significantly increases the overhead of the data transport operation, as well as the amount of time necessary to establish a connection.

Accordingly, improvements are needed in integrating a cluster of processor nodes, using a cluster alias address, such that the cluster appears as an individual processor node without incurring the detrimental overhead that is present in prior art systems.

SUMMARY OF THE INVENTION

The foregoing prior art problems are overcome by the present invention. In accordance with the present invention, a method is disclosed for making a cluster of processor nodes appear as a single processor node to client applications that operate in conjunction with that cluster. More particularly, the cluster is provided with a skinny stack application for selecting a processor node to which a connection will be established as a function of the TCP port numbers that the processor node is monitoring. Further, the cluster is provided with a method for tunneling data packets between processor nodes of the cluster such that they do not have to be re-transmitted across a network. Further still, the cluster is provided with a virtual subnetwork or "subnet" to which the cluster alias address can be associated. The route to that subnet being advertised to the network routers by the processor nodes that are associated with the virtual subnet. Lastly, the cluster is provided with a method for preventing retransmission of data packets addressed to a processor node that has failed. With such an approach, the address of the failed processor node is acquired by another processor node for the duration of the routing failover delay. Using such a method, data packets directed to the failed processor node will be serviced during that routing failover delay.

With such an approach, a cluster of processor nodes is made to appear as a highly available single processor node when accessed by client applications running on other clusters.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. The drawings are not meant to limit the invention to particular mechanisms for carrying out the invention in practice, but rather, are illustrative of certain ways of performing the invention. Other ways of performing the invention will be readily apparent to those skilled in the art.

DETAILED DESCRIPTION OF THE INVENTION

I. Single Processor Node

Figure 1:
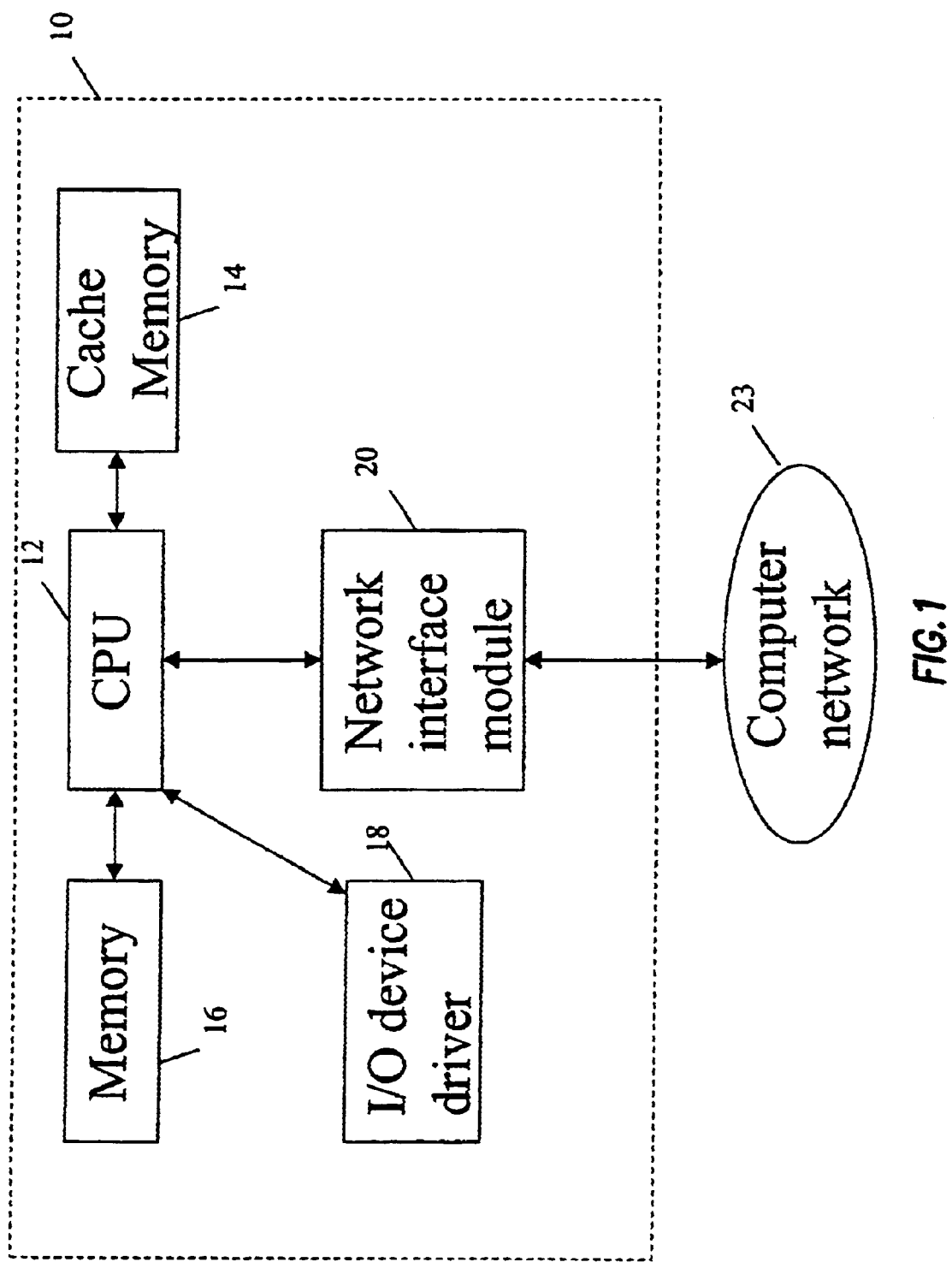
FIG. 1 is a schematic drawing of a single processor node coupled to a network.

Referring to the drawings, FIG. 1 is a block diagram of a single processor node 10. The processor node includes a central processing unit (CPU) 12 coupled to a cache memory 14, a main memory 16 and an I/O device driver 18. The processor node 10 is coupled to a computer network 22 via network interface module 20. The network interface module 20 has an associated network layer address to which packets of information, transferred on the computer network by other processor nodes, can be directed. The network layer address therefore allows remote processor nodes to communicate with one another through the passing of packets of information across the computer network 23. Each packet includes a header that contains the network layer addresses of the originating processor node and the network layer address of the destination processor node.

II. Clusters of Processor Nodes

Figure 2:
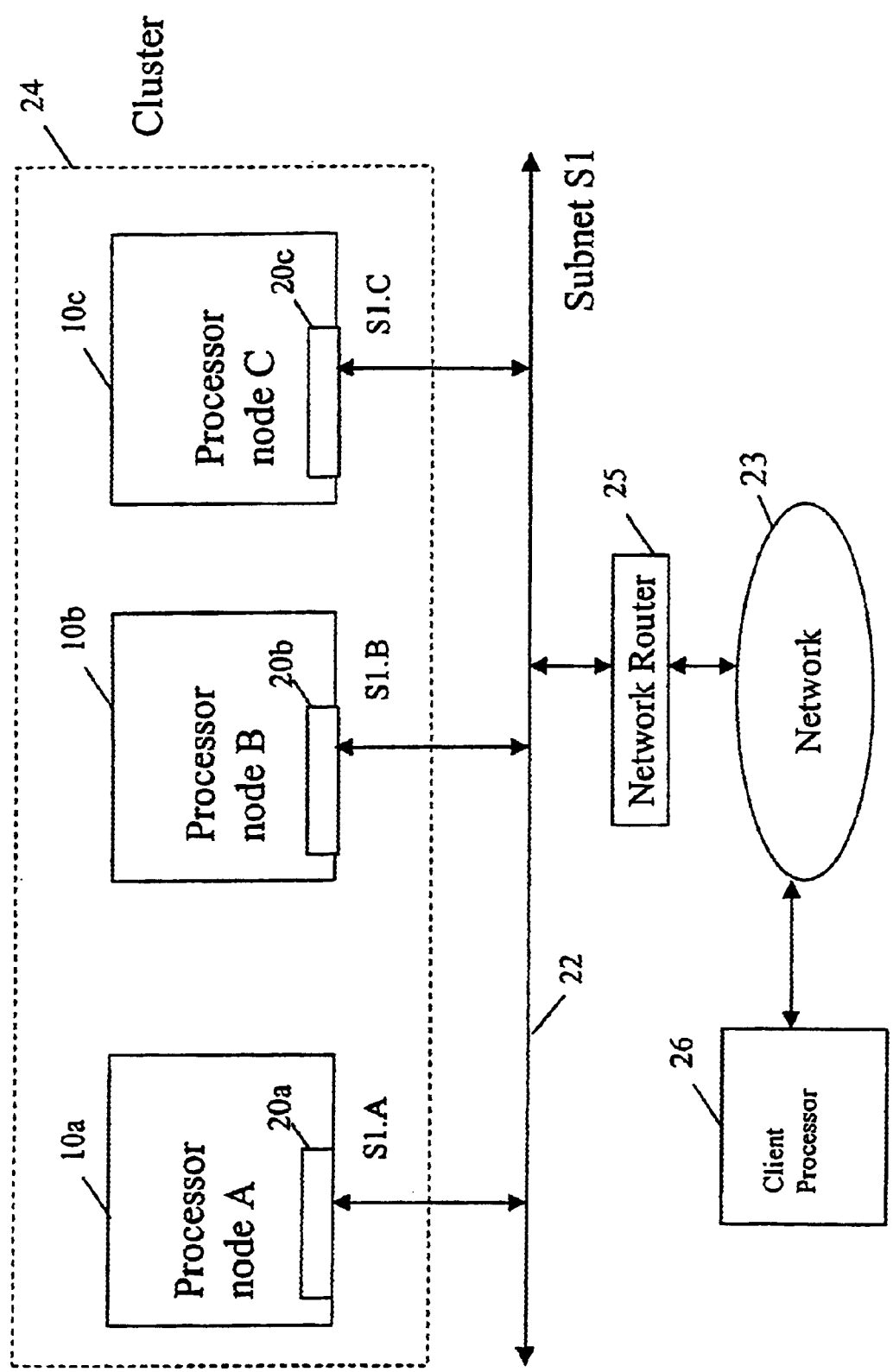
FIG. 2 is a schematic drawing depicting a number of processor nodes of FIG. 1 arranged in a cluster.

Referring now to FIG. 2, a group of processor nodes are shown connected in an arrangement referred to as a "cluster" 24. A cluster 24 is a collection of processor nodes tightly coupled via a computer network and acting in concert with one another. Processor nodes 10a–10c are shown connected together via network interfaces 20a–20c and via the computer network 23. The indicated portion of computer network 23 is referred to as a subnet, and in this case "subnet S1" 22. Each of the processor nodes 10a–10c are referred to as Processor nodes A-C and, for illustration purposes, have thirty-two bit network layer (or IP) addresses S1.A, S1.B and S1.C, respectively. Further, a client processor node 26 is also shown connected to subnet 22 via a network 23 and a network router 25.

Cluster 24 is associated with a single network layer address such that it appears as a single processor node to a client 26 located outside the cluster, i.e. on the other side of network 23. That network layer address is associated with all the processor nodes 10a–10c in the cluster 24 and is referred to as a "cluster alias address". Using the cluster alias address, data packets are directed to a specific cluster of processor nodes. However, the cluster alias address does not specify the processor node within the cluster to which the data packet should be directed. Therefore, in order to direct incoming data packets to the processor nodes 10a–10c that have established connections with associated source applications, each processor node 10a–10c has the ability to distribute those data packets within the cluster 24. The processor node and application receiving the data packets will hereinafter be referred to as the "receiving processor node" and "receiver application," respectively.

III. Data Transfer Via a Connection

Data packets that are transferred between processor nodes of different clusters are typically associated with a virtual circuit referred to as a connection. A connection is a construct that is established by both the source processor node and the destination processor node for exchanging data via data packets. More specifically, the connection is established by applications running on the source and destination processor nodes. When an application program running on the source processor node requires a service provided by another cluster, it sends a data packet to that cluster's alias address. Such data packets that arrive at cluster 24 include a TCP/IP header portion 30 which contains information regarding an associated connection to a processor node if such connection exists.

Figure 3:
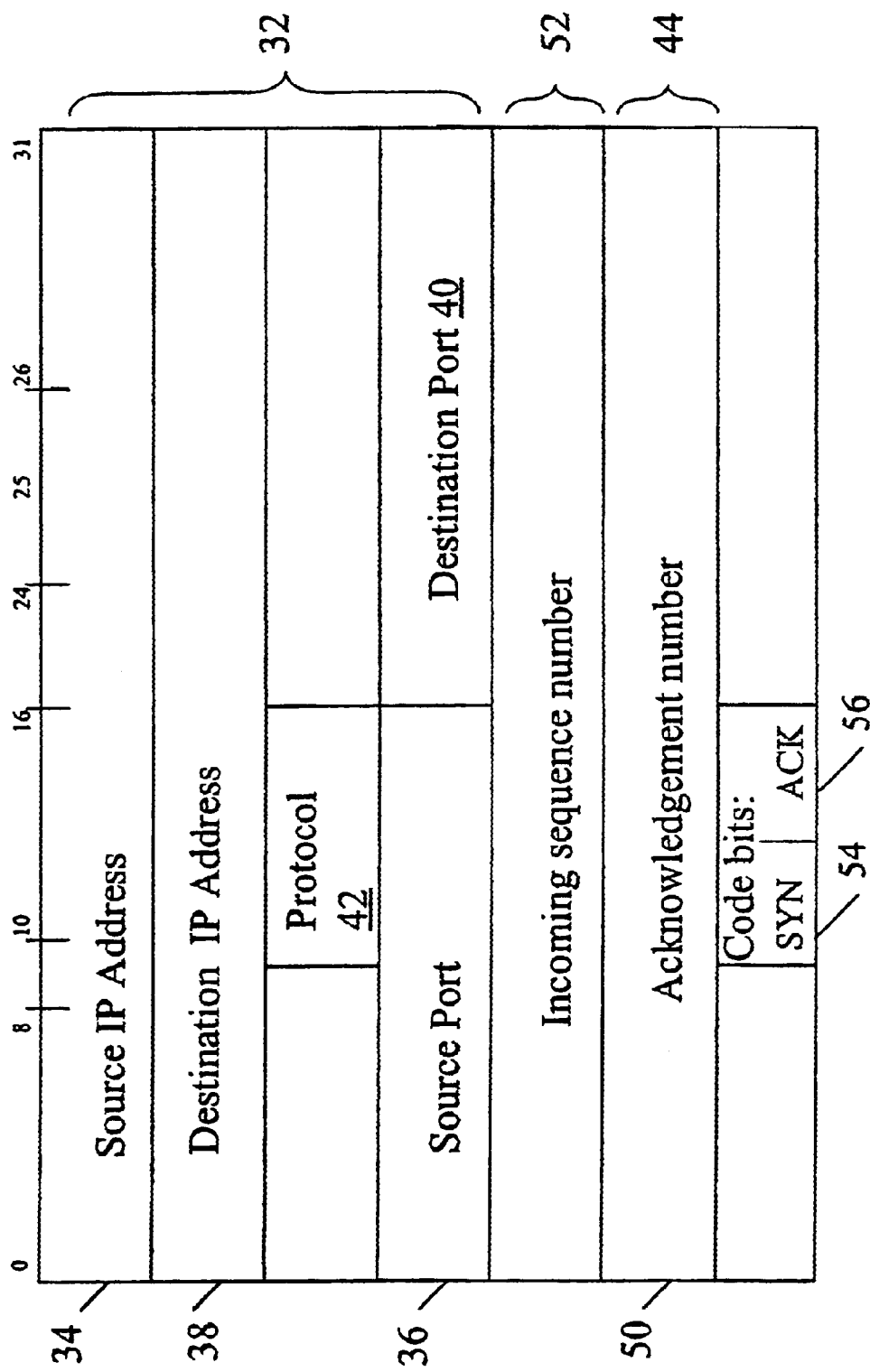
FIG. 3 is a block diagram of a TCP-IP packet header issued from the cluster depicted in FIG. 2.

Referring now to FIG. 3, the configuration of the TCP/IP header information is depicted. In the first portion 32 of TCP/IP header 30, the aforementioned connection is identified by several fields, collectively referred to as the "five-tuple" 32. The source IP address field 34 identifies the thirty-two bit network layer address of the processor node or cluster, that sent the associated data packet to cluster 24. The destination IP address field 38 identifies the thirty-two bit network layer address of the destination processor node or cluster 24. The source port field 36 identifies the TCP port number for the application on the source processor node that sent the data packet. The port number identified by the source port field 36 is typically assigned only for as long as the connection exists. When the connection is closed, such as when an entire data file has been successfully transferred, the port number is deallocated. Likewise, the TCP port number used by the application running on the destination processor node is stored in the destination port field 40. Also, the protocol being used by the associated data packet is represented by an eight bit value that is stored in the "Protocol" field 42.

The TCP/IP header 30 further includes an incoming sequence number field 52 and an acknowledgment, or outgoing sequence number field 44, collectively referred to as the "sequence number fields." The sequence number fields 52 and 44 are typically used to order data packets that are associated with a fragmented data transfer. In addition, the sequence number fields 52 and 44 are used to confirm that all such data packets successfully arrived at the destination processor node.

More specifically, data to be transferred from one processor node to another will be fragmented into many data packets that are independently transferred. Sequential numbers are stored in the sequence number fields 52 and 44 of each data packet header to indicate the relative position of that data packet within the transfer. Although some packets may arrive at the destination processor node out of order, the total number of data packets must arrive for a successful data transmission to occur. By monitoring the sequence numbers from the sequence number fields 52 and 44 of each data packet, a destination processor node can determine whether all the data has been transferred that was intended to be transferred.

The header 30 also includes a number of code bits, one of which is referred to as the "synchronize sequence numbers" or "SYN" bit 54. The source processor node sets the SYN bit 54 before it sends the initial data packet to the cluster alias address to request establishment of a new connection. Another code bit, referred to as the "acknowledgment valid" or "ACK" bit 56 is also included in the header. The operation of the SYN 54 and ACK 56 bits will be described in more detail below.

Figure 4:
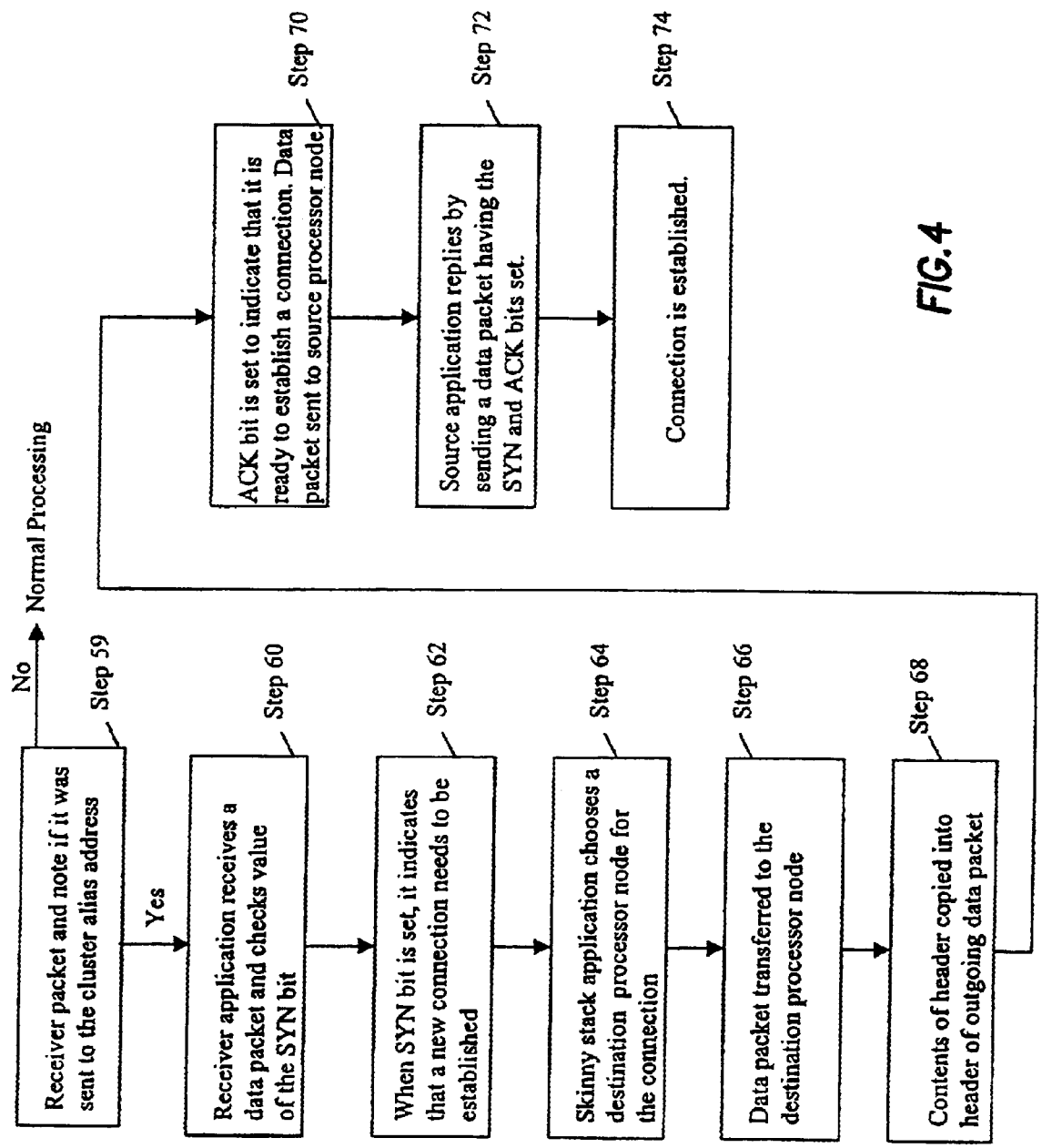
FIG. 4 is a flow diagram of the present invention method for establishing a connection by a cluster such as the cluster depicted in FIG. 2.

Referring now to FIG. 4, a flow diagram depicts the establishment of a new connection. When the receiver application running on a processor node 10 within the destination cluster 24 receives the data packet, it first determines whether the packet was sent to the cluster alias address. If not, the packet is handled normally. If the packet was sent to the cluster alias, the application executes a routine, referred to as the "skinny stack" routine, to perform cluster-alias specific checks on the packet (Step 59). The skinny stack application checks the value of the SYN bit 54 (Step 60). When the SYN bit 54 is set, the skinny stack application knows that a new connection needs to be established (Step 62). It executes a routine, referred to as the "round robin" routine, for choosing a processor node 10 within the cluster 24 that has the correct service application running for this connection request, and will be associated with the new connection (Step 64). That chosen processor node will hereinafter be referred to as the destination processor node.

Once the destination processor node is chosen, the data packet is transferred to it by the receiver application (Step 66) and is matched up with the correct service application.

A receiver application running on the chosen destination processor node acknowledges the connection by copying the contents of the incoming data packet header into the header of an outgoing data packet. Additionally, the network layer address of the destination processor node is added to the header (Step 68). The receiver application does not change the value of the SYN bit 54, but rather sets the other code bit referred to as the "acknowledgment" or "ACK" bit 56. The ACK bit 56 is set to indicate to the source application that the destination processor node has received the data packet containing the asserted SYN bit 54 and that it is ready to establish a connection (Step 70). Subsequently, the outgoing data packet is transmitted to the source processor node. The source application replies to that data packet with a final data packet containing asserted SYN 54 and ACK 56 bits (Step 72). When the destination processor node receives that data packet, the connection is established (Step 74).

When the receiver application is started, it binds to a TCP port number identifying the service being offered. When the source application initiates the connection, it selects or "binds" a TCP port number to identify its half of the connection within the source processor node, and also specifies the destination port which identifies the service in the destination processor node to which it is trying to connect. This is the same port number to which the receiver application on the destination processor node has previously been bound. The TCP port numbers essentially designate queues into which arriving data packets are placed for service by an appropriate application running on the receiving processor node.

IV. Skinny Stack Application

In response to a request for establishment of a new connection, prior art systems arbitrarily select a destination processor node within the cluster to establish that connection. If the selected processor node is not monitoring or "listening on" the same TCP port as the client application, the connection will fail. The connection attempt will be repeatedly retried, in hopes of connecting to another processor node, until a "time-out period" expires. Such connection retries make the cluster appear not as a single node, but rather as a collection of nodes, only some of which are available for establishing connections. In one embodiment of the invention, the skinny stack application chooses destination processor nodes in a manner that reduces the likelihood that a connection attempt will need to be re-tried, thus making the cluster appearance more similar to a single processor node.

Consider a data packet that arrives at a processor node 10*b* (for example) within cluster 24, the data packet identifying the cluster alias address as its destination IP address. A receiver application running on that processor node 10*b* determines whether the data packet was sent to the cluster alias address. When the destination IP address is determined to be the cluster alias, the processor node 10*a* executes the skinny stack. Next, the skinny stack application determines whether the data packet is associated with an existing connection or whether a new connection needs to be established. Upon determining that a new connection should be established, the skinny stack application determines a processor node 10*a* or 10*c* within the cluster 24 to which the data packet will be transferred for establishment of the connection.

The skinny stack application chooses a processor node 10*a* or 10*c* within the cluster 24 after considering whether that processor node 10*a*, 10*c* has a receiver application "listening" for data packets associated with the same destination TCP port number as the client application that sent the data packet. If the destination processor node is not listening on the same TCP port as the source application, it will not be selected to establish the connection, and another processor node in the cluster that is listening on this destination port number will be selected. To that end, a cluster wide registration, identifying the TCP port numbers that each processor node is listening on, is maintained.

When a receiver application, running on a processor node within the cluster, begins to listen on a TCP port, it issues a "listen" system call. The listen system call sends a message to the other nodes in the cluster to indicate that the associated processor node has begun listening on that port. Each processor node in the cluster stores the information contained in the message in a look up table. This look up table is accessed each time the skinny stack application is executed by any of the processor nodes in the cluster.

To further aid distribution of new connections by the skinny stack application, each processor node within the cluster associates a value, referred to as the "selection weight" value, with the cluster alias to which it belongs. The selection weight indicates a processor node's capacity for servicing new connections, in relation to the other processor nodes in the cluster. Accordingly, a database of those selection weights is maintained by each processor node within the cluster. When the skinny stack application is executed, it indexes that database using a combination of a processor node's alias address and Host ID. Each TCP port that a processor node is listening on will be associated with the same selection weight. It should be noted that in an alternative embodiment, the selection weight can be refined such that it is associated with a combination of a processor node's alias address, Host ID and a TCP port that it is listening on. In such a manner, each TCP port that a processor node is listening on can be associated with a different selection weight.

More specifically, the selection weights indicate the number of new connections that a processor node will be issued from the skinny stack application before a connection is issued to another processor node listening on the same TCP port. For example, consider that processor nodes 10*a* and 10*b* are each listening on TCP port number 6000 and have selection weights of 5 and 1, respectively. Therefore, five new connections will be issued to processor node 10*a* for each new connection issued to processor node 10*b*.

Figure 5A:
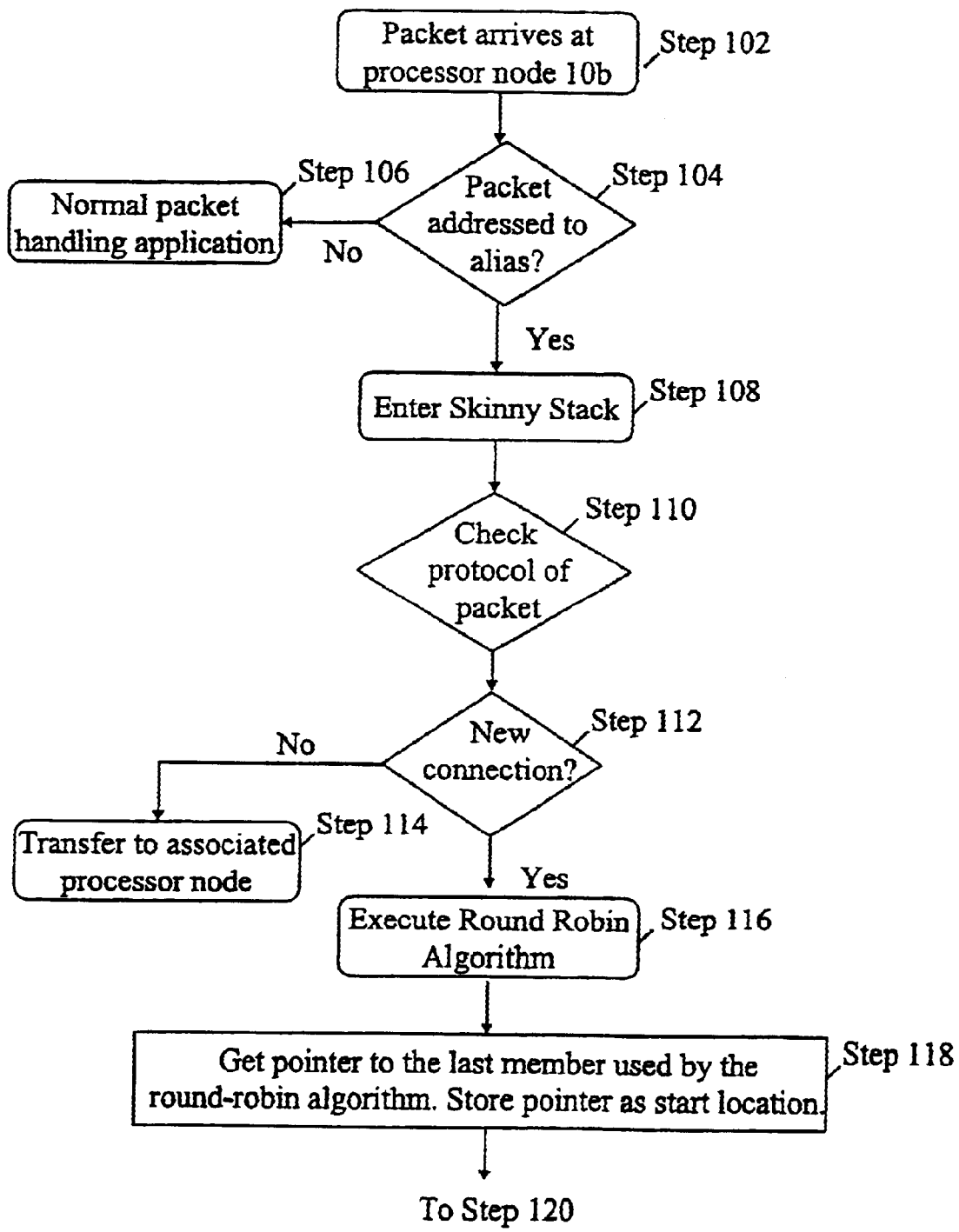
FIGS. 5A and 5B are flow diagrams depicting the operation of the skinny stack application of the present invention, executing on a processor node of the cluster of FIG. 2.
Figure 5B:
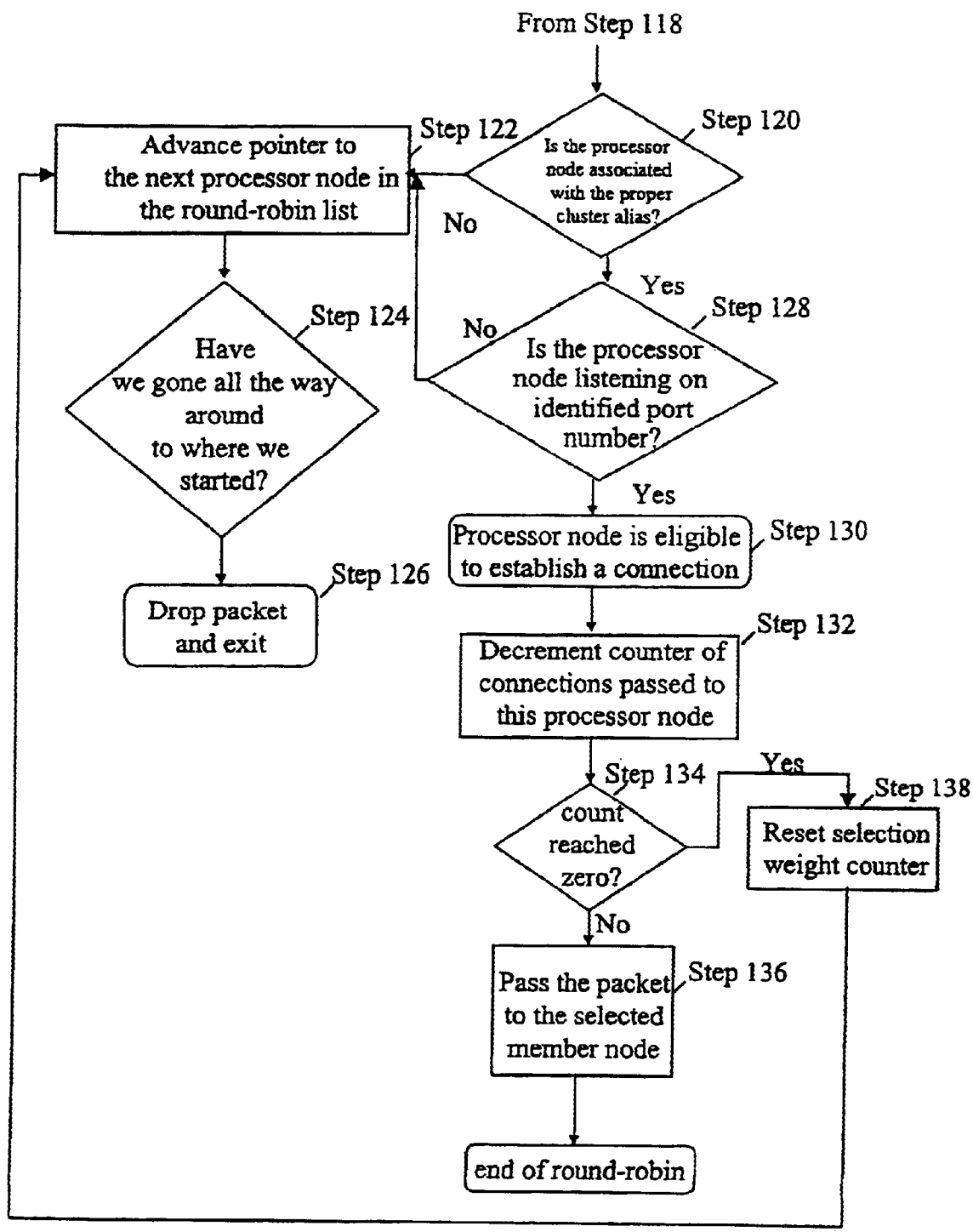

Referring now to FIGS. 5A and 5B, a flow diagram illustrates the operation of the skinny stack application in accordance with the foregoing features of the present invention. Consider a data packet that arrives at processor node 10*b* (Step 102). The receiver application, execution processor node 10*b*, looks at the destination IP address field 38 of the data packet header 30 to determine whether it was sent to processor node 10*b* explicitly, or whether it was sent to the cluster alias address (Step 104). If the data packet was sent to processor node 10*b* explicitly, it is handled by the normal IP stack application (Step 106). Alternatively, if the data packet was sent to the cluster alias address, it is evaluated by the skinny stack application executed on processor node 10*b* (Step 108).

The skinny stack application first determines whether the data packet was sent using the TCP or UDP network protocols as indicated by protocol field 42 of the data packet header 30 (Step 110). Assuming that the data packet was sent using the TCP network protocol, the value of the SYN field of the data packet's header is used to determine whether the data packet is associated with an existing connection or is requesting the establishment of a new connection (Step 112). If the data packet is associated with an existing connection it will be transferred to the associated processor node for servicing (Step 114).

Alternatively, if the data packet requests the establishment of a new connection, a round robin routine is initiated by the skinny stack application for distributing new connections to processor nodes within the cluster (Step 116). The round robin routine maintains a sequential list of processor nodes that are candidates for receiving connections to incoming data packets to the cluster. Each time that the skinny stack application is executed, it accesses a software pointer that points to the last processor node that received a connection, i.e. during the previous execution of the routine. That processor node will be the first candidate for receiving the new connection. Also, that software pointer is stored to indicate the starting point for the present execution of the routine (Step 118).

Subsequently, a determination is made as to whether the candidate processor node is associated with the cluster alias address to which the data packet was directed (Step 120). If the candidate processor node is not associated with that cluster alias address, the round robin routine increments the software pointer and considers the next processor node in the sequential list (Step 122). After the software pointer is incremented, the round robin routine determines whether it is pointing to the starting point noted above (Step 124). If the software pointer is pointing to the same location in the sequential list as it was when the round robin routine was initiated, none of the processor nodes within the cluster are associated with the cluster alias address to which the data packet is directed. Therefore the data packet will not be serviced by the cluster and the round robin routine is terminated (Step 126).

If the candidate processor node is associated with the cluster alias address to which the data packet was sent, the routine accesses the above mentioned cluster-wide registration to determine whether it is listening on the TCP port number identified by the data packet (Step 128). If that processor node is not listening on the TCP port number, the software pointer is incremented and another processor node is considered for the connection (Step 122). If the processor node is listening on the TCP port number, it is eligible to receive the new connection (Step 130). A counter, that was initialized to a value equal to the selection weight for the candidate processor node, is responsively decremented (Step 132). If the resulting value of the counter is not zero (Step 134), the data packet is forwarded to the selected processor node (Step 136) using a procedure referred to as "tunneling," as will be described below.

A further enhancement to the distribution of new connections by the skinny stack application in the present invention, is the issuance of a "selection priority" to each processor node within the cluster. The selection priority indicates that the skinny stack application will distribute new connections among processor nodes having the highest selection priority. More than one processor node can share the highest selection priority. The round-robin routine will only select a destination processor node from among those active nodes listening on the destination port that share the highest selection priority. If all nodes at the highest selection priority are not functioning or are "down", the round robin routine will select a destination processor node from those nodes sharing the next highest selection priority, and so forth. Once one or more processor nodes with a higher selection priority come back "up", the round robin routine will once again select from them, to the exclusion of any nodes with lower selection priority. Because the processor nodes that are most efficient for the services required are given the highest priority, data packets will only occasionally be serviced by less efficient processor nodes.

V. Cluster Alias Tunneling

When a TCP/IP data packet arrives at a processor node within cluster 24, it is stored by the receiver application in a data structure such that it is queued for service by that processor node. When the receiving processor node is running the Digital UNIX operating system, the data packet is reconfigured by the receiver application and stored in a linked-list data structure referred to as an "Mbuf chain." Because the elements of the data structure are linked, they operate as an input queue for sequentially delivering the received data packets to higher layers of network applications. When a data packet is delivered to the receiver application, a determination is made as to whether an existing connection is associated with the client application that sent the data packet or if a new connection should be generated. That determination is performed by checking the value of the SYN bit 54 of the data packet's header 30. If the SYN bit 54 is set to a logical one, it indicates that the data packet is requesting the establishment of a new connection, as previously described.

When a new connection is generated, the receiving processor node executes the skinny stack routine to choose a destination processor node 10 within the cluster 24 that will receive the new connection as described above. Once that destination processor node 10 is chosen, a transfer operation is performed to convey the data packet to that processor node 10. Likewise when the receiver application determines that an existing connection is associated with the received data packet, the same transfer operation is performed to redirect the data packet to the destination processor node.

Typically, receiver applications of prior art systems perform that transfer operation by modifying the destination field of the TCP/IP header to indicate the network layer address for the chosen processor node. Thereafter, the data packet is sent to the network interface device and re-transmitted over the network using the normal network routing methodology. When the data packet is prepared for re-transmission, the operations performed to configure the Mbuf chain data structure must be undone. Also, when the data packet reaches the chosen processor node, the receiver application has to reconfigure the Mbuf chain data structure. Accordingly, such modification and retransmission of the data packet adds overhead processing time. The present invention significantly reduces such overhead processing.

Generally, the present invention takes advantage of the fact that when the data packet is stored in the Mbuf chain data structure of the receiving processor node, it is in the same configuration that the chosen processor node requires. Therefore, that Mbuf chain data structure is sent across a cluster interconnect (a specialized communications path that is optimized for communications between processor nodes within a cluster) in such a way that it is directly stored in the Mbuf chain for the chosen processor node. That operation, referred to as "tunneling" or "cluster alias tunneling," avoids a significant portion of the overhead of re-transmitting the data packet.

Figure 6:
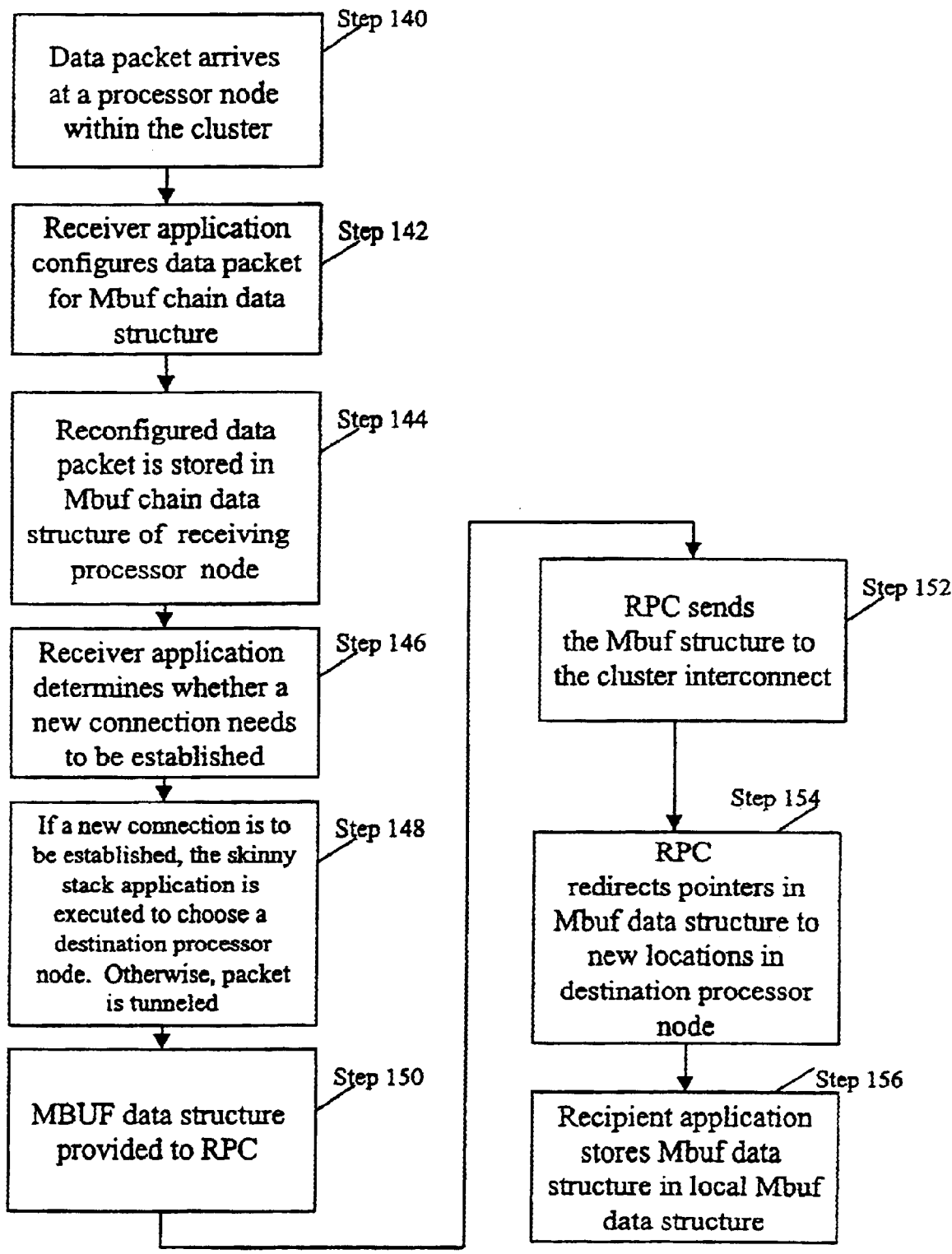
FIG. 6 is a flow diagram depicting the tunneling of a data packet between processor nodes of the cluster depicted in FIG. 2, according to the present invention.

Referring now to FIG. 6, a flow diagram depicts the cluster alias tunneling operation. For illustration purposes, consider a TCP/IP data packet that arrives at a processor node 10*b* within the cluster 24 (Step 140). The receiver application running on processor node 10*b* removes the header and data portions of the data packet and configures them in a manner specified by the Mbuf chain data structure (Step 142). Thereafter, the reconfigured data packet is stored in the Mbuf chain and queued for service by the higher level network applications (Step 144).

The receiver application determines whether the data packet is associated with an existing connection or whether a new connection needs to be established (Step 146) as discussed above in FIG. 4. If a new connection is to be established, the destination processor node is determined by executing the skinny stack application in the manner previously described (Step 148). If the data packet is associated with an existing connection, the destination processor node is established by reference to a cluster-wide connection registration database.

Next, the Mbuf data structure that stores the data packet is provided to a Remote Procedure Call (RPC) (Step 150). The RPC is issued and transfers the Mbuf data structure across the cluster interconnect to the destination processor node. Such a transfer takes advantage of the fact that each Mbuf data structure of each processor node within the cluster uses the same configuration. Therefore, when the receiving processor node configures the Mbuf data structure, it is in a form that is utilizable by any processor node within the cluster. By transferring the Mbuf data structure to the destination processor node using the tunneling operation, the overhead of re-transmitting that structure on the network is not incurred. That is because the overhead needed to transform the Mbuf data structure back into data packets, to transfer them across the network, and then reconstruct a new Mbuf data structure at the destination node is replaced by the overhead needed to tunnel the Mbuf data structure across the cluster interconnect.

The operation of transferring the Mbuf data structure to the destination processor node is initiated when a dedicated application (RPC), running on the receiving processor node, sends the Mbuf data structure to the cluster interconnect (Step 152). The cluster interconnect is a specialized communications path that is optimized for communications between processor nodes within a cluster. The cluster interconnect operates in concert with separate "sender" and "recipient" applications running on the receiving and destination processor nodes, respectively. The sender application is the RPC referred to above which implements a technique, referred to as "marshalling," for transferring the Mbuf data structure to the recipient application. Marshalling involves redirecting any pointers in the Mbuf structure so that they point to the new memory locations in the destination processor node (Step 154). Data structures that are sent from the sender application, via the cluster interconnect, are automatically identified by the recipient application as being tunneled.

The recipient application, running on the destination processor node, bypasses that processor node's normal data packet handling application and stores the tunneled data structure in its Mbuf data structure (Step 156). Accordingly, the Mbuf data structure is queued for service by the destination processor node without the data packet being re-transmitted on the network.

Cluster alias tunneling relies on the ability of a processor node to issue a RPC. The ability to issue RPC calls is generally available on all UNIX operating systems including the Digital Unix operating system. The ability to define a custom data type for a data structure such as the Mbuf data structure, so that parameters of this structure type can be transparently passed as arguments to the Remote Procedure, is also a standard capability of all RPC implementations. The advantage of Cluster alias tunneling relies on the RPC calls being issued over a high-speed communications interface (e.g. Gigabit Ethernet or ATM) that connects all members of the cluster. It is not critical what specific interface is employed, as long as the RPC mechanism uses it efficiently.

VI. Virtual Subnet Addressing

Figure 7:
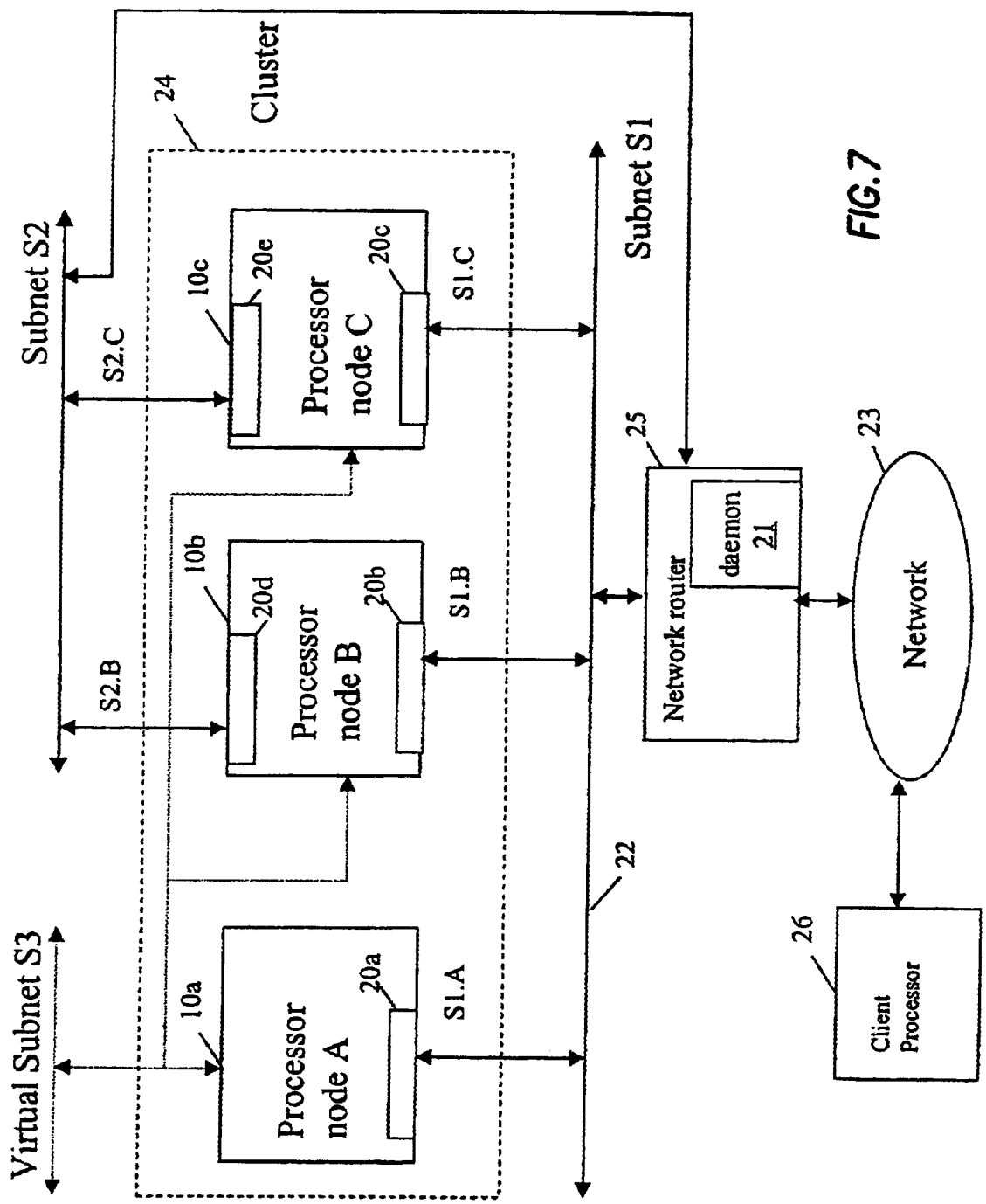
FIG. 7 is a schematic drawing depicting a number of processor nodes of the cluster of FIG. 2 arranged in a virtual subnet, according to the present invention.

Referring now to FIG. 7, each processor node 10a–10c may include more than one network interface module. Each of those network interface modules 20a–20e may be connected to physical networks referred to as "physical subnets." Subnets are a means provided by the IP networking architecture to provide a hierarchical approach to routing network packets. It is assumed that processor nodes using addresses in the same physical subnet can send each other data packets without requiring the services of an intervening router node, whereas processor nodes using addresses in different physical subnets must send each other data packets through one or more router nodes.

More specifically, a physical subnet is an arrangement of adjacent processor node network layer addresses. Such an arrangement of network layer addresses are differentiated by a network router through the use of a bitmask, referred to as a "subnet mask". The subnet mask is logically "ANDed" with the identified destination address, e.g. the cluster alias address. The result of the masking operation is that the destination address is converted into a subnet address identifying the subnet to which the data packet should be directed. Two network layers addresses are in the same subnet if the result of "ANDing" the addresses with their associated subnet mask results in the same subnet address. It is assumed that two nodes sharing the same subnet address can communicate directly without requiring the services of a network router. The whole network layer address is then used to discern the proper node within the subnet to which the data packet is directed.

Cluster 24 is shown to include a subnet S3 that is not associated with a physical connection to the associated processor nodes. Such a subnet is referred to as a "virtual subnet" rather than a physical subnet. Although each processor node associated with a virtual subnet does not have a physical connection to that virtual subnet, they "advertise" the location of that virtual subnet to router 25 and to the routers included in network 23. Each processor node 10 in the cluster 24 uses IP routing to advertise itself as a network route to the associated virtual subnet.

One or more cluster alias addresses may be "configured in" a virtual or physical subnet. In other words, the subnet address is essentially the same as the cluster alias address, except for the least significant value. That least significant value is used to discriminate between different cluster alias addresses within the virtual subnet.

The disadvantage that arises with a cluster alias address in a physical subnet configuration is that nodes in the same physical subnet as the cluster alias know that they are directly connected. As such, those processor nodes use the ARP protocol directly to find the physical address of destination nodes within the cluster. The ARP protocol specifies that only one node in a subnet can respond to an ARP request. As a result, all traffic for the cluster alias address, originating from processor nodes within the physical subnet, are initially delivered to one cluster node, i.e. the one that is dedicated for issuing ARP responses. That processor node essentially acts as a router for the cluster alias address and therefore may be overloaded by ARP requests.

Alternatively, if a cluster alias address is configured in a virtual subnet, i.e. one to which no network layer addresses belong other than cluster alias addresses, then no client processor node will think it is in the same subnet as the cluster alias address. Therefore the ARP protocol will not be used to send packets to the cluster alias. Instead, normal IP routing methods will be used.

More specifically, to implement a virtual subnet design, all nodes in the cluster run a standard IP routing protocol and advertise that they have a physical connection to the virtual subnet. By advertising that they have a physical connection to the virtual subnet, the processor nodes ensure that any data packet that is directed to an address contained within the virtual subnet will be forwarded to one of the processor nodes of the cluster by the associated network routers. Accordingly, data packets that are addressed to a cluster alias address that is associated with a virtual subnet, arrive at one of the associated processor nodes because that processor has indicated that it has a physical connection to the virtual subnet. That processor node intercepts the data packets addressed to the virtual subnet and handles them locally.

Figure 8:
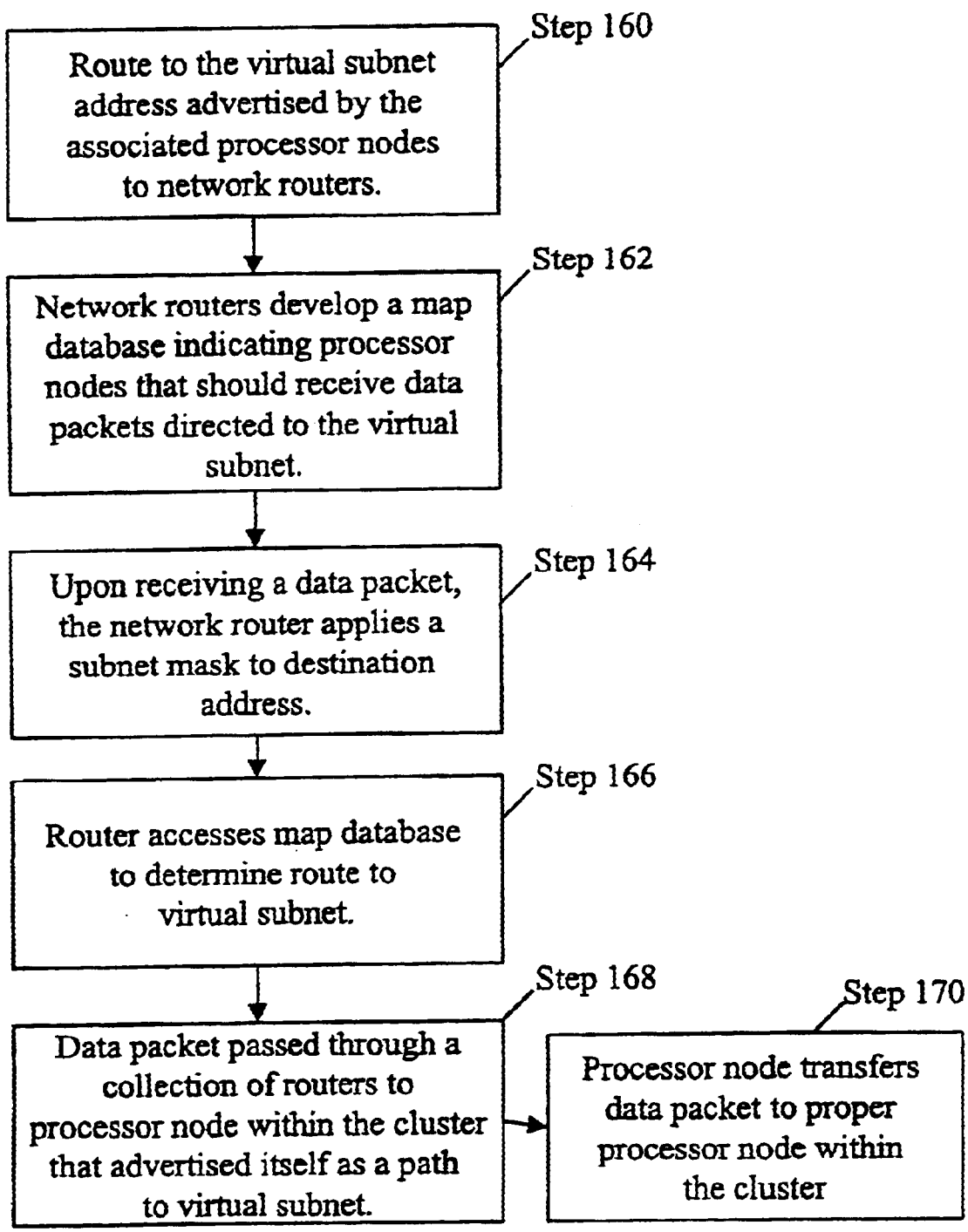
FIG. 8 is a flow diagram depicting the use of virtual subnet addressing on the processor nodes of FIG. 2, according to the present invention.

Referring now to FIG. 8, a flow diagram depicts the operation of virtual subnet addressing. The routers that comprise network 23 (FIG. 7) have to know where to send a data packet that is addressed to any network layer address, including a cluster alias address associated with a virtual subnet S3. Therefore, a route to the virtual subnet address must be advertised by the associated processor nodes to the routers that comprise the associated network 23 (Step 160). Such route advertisement is achieved by using a common IP routing protocol such as RIP or OSPF. Through the advertising of virtual subnet routes, all the routers in the network develop a map database that indicates which processor nodes should receive data packets that are directed to particular virtual subnet addresses (Step 162). Therefore, when a router that has a physical connection to the cluster receives a data packet from the network, it applies a subnet mask to determine the subnet portion of the destination address (Step 164). Assuming that the data packet is destined for virtual subnet S3, the router will access its map database and determine that processor nodes 10a–10c have advertised themselves as a network route to virtual subnet S3 (Step 166).

Thereafter, the packet is passed to one of those processor nodes (Step 168). The receiving processor node analyzes that data packet's header and transfers it to the appropriate processor node within the cluster using cluster alias tunneling, as previously described (Step 170). The router may choose a different processor node within the cluster for each packet it is sending, according to whether it is using a routing routine to split data traffic across multiple equivalent paths to the same destination.

Accordingly, through the use of virtual subnet addressing, processor nodes within a cluster will not be overloaded, since the router protocols can spread the packets across all processor nodes within the cluster, rather than sending all packets addressed to a given cluster alias address through the same processor node in the cluster.

VIII. Router Address Takeover

As previously stated, clusters communicate with each other by sending data packets across network 22. Network 22 includes network router devices that forward those data packets to their respective destination processor nodes. Each network router maintains a map database that indicates available network paths over which data packets can be sent to reach particular processor nodes. Those network paths may include other routers and other clusters. That map database is maintained by a routing daemon process or "daemon" 21 that executes on each network router 25. The daemon processes 21 queries the processor nodes and network routers to which it is connected to find out which processor nodes and network routers they are connected to. Accordingly, the routing daemon 21 puts together a table of routes from the router to each processor node.

Refer again to the processor nodes 10a–10c of FIG. 7 that are associated with subnet S1. A routing daemon 21 that queries processing nodes 10a–10c generates a map indicating that each of those processor nodes can be used as paths to subnet S1. Of the three processor nodes 10a–10c, the network router 25 typically selects one to use as a preferred path to subnet S1.

For illustration purposes consider that processor node 10a is the preferred path to subnet S1. When processor node 10a crashes, the network router will stop getting responses to its queries. After a predetermined period of time has expired, the routing daemon 21 will timeout while waiting for a response from processor node 10a. Such a timeout is referred to as the "routing failover period". The routing daemon 21 thereafter replaces processor node 10a as the preferred route to subnet S1 with either processor 10b or 10c. Such a timeout can take up to two minutes, during which time data packets are still sent to processor node 10a by the network router 25. Because processor node 10a has crashed, those data packets will not be delivered and therefore will have to be re-transmitted by the client application. Such re-transmissions substantially impact system performance. Therefore the present invention avoids re-transmissions of data packets by allocating the address of the processor node that crashed, to a functioning processor node in the same cluster. In that manner, the otherwise undeliverable data packets are delivered to the functioning processor node such that they are able to be serviced.

Figure 9:
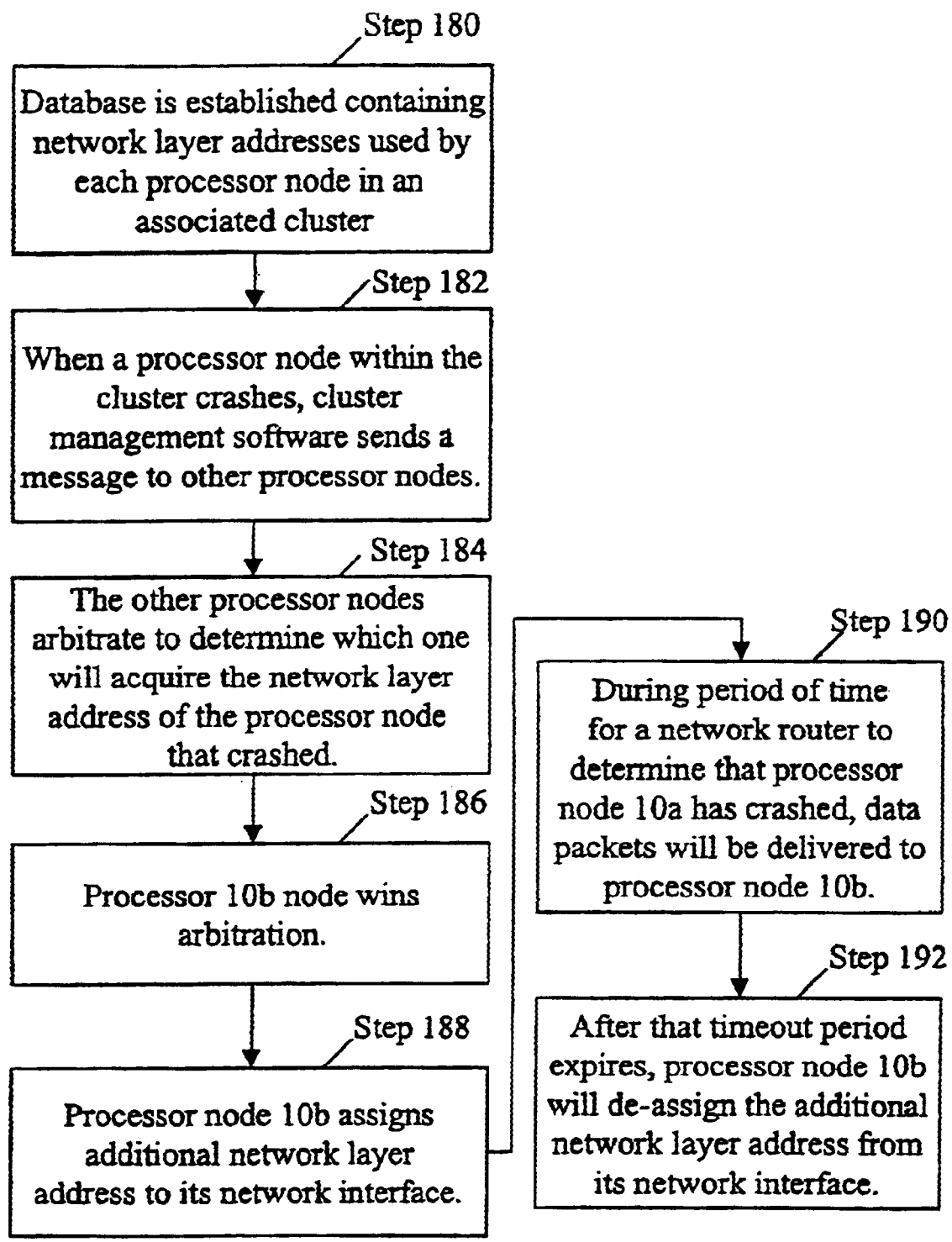
FIG. 9 is a flow diagram depicting the router address takeover operation of the present invention, running on the processor nodes of FIG. 7.

Referring now to the flow diagram of FIG. 9, the operation of the router address takeover method is shown. When a cluster is configured, each processor node within that cluster establishes a database containing the network layer addresses used by each of the processor nodes in that cluster (Step 180). For example, processor node 10a would have a database that shows that processor node 10b is using network layer addresses S1.B and S2.B and that processor node 10c is using network layer addresses S1.C and S2.C. Also, as previously stated, those processor nodes are tightly coupled through the use of a cluster management application. That cluster management application sends a message to the other processor nodes within the cluster when one of those processor nodes crashes. Accordingly, if processor node 10a crashes, the cluster management software sends messages to processor nodes 10b and 10c (Step 182). Processor nodes 10b and 10c arbitrate among themselves to determine which one will acquire the network layer address of processor node 10a (Step 184).

For illustration purposes, consider that processor node 10b wins the arbitration (Step 186). Therefore, processor node 10b can assign address S1.A to its network interface along with network layer address S1.B (Step 188). Therefore, during the period of time that it takes for an associated network router to determine that processor node 10a has crashed, data packets that are sent to processor node 10a will be re-directed to processor node 10b (Step 190). Therefore, no retransmission of those data packets will need to be performed. After the routing failover period has expired, the routers will not send data packets to processor node 10a and therefore processor node 10b will de-assign network layer address S1.A from its network interface (Step 192).

With such a method, data packets that are sent to a non-functioning processor node during its routing failover period, will be handled by another processor node in the same cluster and will not need to be re-transmitted.

While this invention has been particularly shown and described with references to preferred embodiments thereof, it will be understood by those skilled in the art that various form changes and details may be made therein without departing from the spirit and scope of the invention as defined by the appended claims.

What is claimed is:

1. A method for selecting a destination processor node of a cluster of processor nodes sharing a cluster alias address such that a client application can establish a connection to the cluster, said method comprising the steps of:

receiving a request, at any receiving processor node identified by the cluster alias address, from the client application, for requesting establishment of a connection to the cluster, the request containing a port number; and selecting, using the receiving processor node, a destination processor node from the cluster of processor nodes sharing the cluster alias address, based on whether the destination processor node is monitoring the port number, the port number being maintained in a look up table on each processor node sharing the cluster alias address, the look up table being dynamically modified as each receiving processor node listens, and stops listening, for the port number;

wherein the selecting step accesses the look up table each time the request is received.

2. The method for selecting a processor node of the cluster of processor nodes, as described in claim 1, further including the steps of:

using a receiving processor node of the cluster, receiving the request issued by the client application;

determining, by the receiving processor node, that the is requesting the establishment of a connection between the client application and a first application running on the cluster;

choosing the processor node from a group of candidate processor nodes within the cluster, the processor node executing a receiver application that is monitoring the port number; and establishing the connection between the first application and the client application.

3. The method for selecting a processor node of the cluster of processor nodes, as described in claim 2, wherein the choosing step includes the steps of:

accessing a list of candidate processor nodes that are addressable with a cluster alias address of the cluster by the receiving processor node;

determining whether a candidate processor node in the list has a receiver application that is monitoring the port number; and deciding, in response to a determination that a candidate processor node in the list has a receiver application that is monitoring the port number, whether a maximum number of connections have previously been established by that candidate processor node.

4. The method for selecting a processor node of the cluster of processor nodes, as described in claim 3, wherein said deciding step further includes the steps of:

decrementing a counter by a predetermined value, the counter being initialized to a value that is representative of the capacity of the candidate for establishing new connections;

determining if the counter has reached a count of zero;

selecting another candidate processor node in response to a determination that the counter has reached a count of zero; and transferring the request to the candidate processor node in response to a determination that the counter has not reached a count other than zero, such that the connection can be established.

5. The method for selecting a processor node of the cluster of processor nodes, as described in claim 4, wherein the request issued by the client application is a specially configured data packet transferred across an IP network coupled to the cluster of processor nodes.

6. The method for selecting a processor node of the first cluster of processor nodes, as described in claim 5, wherein the request issued by the client application is a TCP/IP configured data packet having a header that includes a SYN bit that is set to indicate that the client application is requesting establishment of the connection to the cluster.

7. The method for selecting a processor node of the cluster of processor nodes, as described in claim 6, wherein the header includes a field that contains the port number.

8. A computer system, comprising:
   a client processor node executing a client application, the client application monitoring a port number;
   a plurality of processor nodes coupled together to form a cluster sharing a cluster alias address, the cluster being responsive to the client processor node, each processor node of the cluster including a CPU for executing a skinny stack application for selecting one node from the plurality of processor nodes sharing the cluster alias address, based on whether the destination processor node is monitoring the port number, such that the selected node serves as a destination processor node; and
   a receiver application executed on the destination processor node for monitoring the port number, the port number being maintained in a look up table on the plurality of processor nodes sharing the cluster alias address, the look up table being dynamically modified as each receiver application listens, and stops listening, for the port number;
   wherein the skinny stack application accesses the look up table each time the skinny stack application is executed.

9. A computer system as claimed in claim 8 wherein the executed application for selecting the destination processor node is a skinny stack application; and the plurality of processor nodes further includes a plurality of memory systems, one for each node in the plurality of processor nodes, each memory system storing the skinny stack application of a respective processor node.

10. The computer system described in claim 9, further including:
    a computer network for coupling the client processor node to the plurality of processor nodes such that the receiver application establishes a connection to the client application across the computer network.

11. The computer system described in claim 10, further including a database that is accessible by each of the plurality of processor nodes, the database indicating a plurality of port numbers that are being monitored by each of the plurality of processor nodes.

12. The computer system described in claim 11 wherein the skinny stack application accesses the database to determine the port number monitored by the receiver application of the destination processor node.

13. The computer system described in claim 12, further including:
    a plurality of software counters, each associated with a different one of the plurality of processor nodes, each time that a connection is established by a receiver application executing on a processor node, the software counter associated with the processor node being decremented by a predetermined value.

14. The computer system described in claim 13 wherein the plurality of software counters are initialized to individual selection weight values that are indicative of the associated processor node's capacity for establishing connections.

15. The computer system described in claim 14 wherein decrementing of the software counter associated with the destination processor node results in a non-zero count value, indicates that the destination processor node has capacity to establish another connection.

16. The computer system described in claim 15 wherein each of the plurality of processor nodes is running The Digital Unix operating system.

* * * * *